Figure 1:
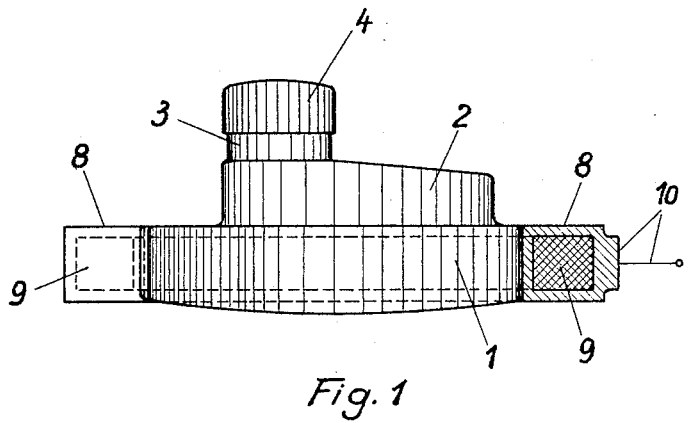

Nov. 5, 1957    M. MEIER-MALETZ ET AL    2,812,461
DRIVE FOR SMALL MACHINERY, ALTERNATIVELY TO
BE USED FOR ELECTRIC AND MECHANICAL ENERGY
Filed March 20, 1956

INVENTORS
MAX MEIER-MALETZ
GERHARD MEIER-MALETZ

By  Toulmin & Toulmin

Attorneys

United States Patent Office 2,812,461
Patented Nov. 5, 1957

2,812,461

DRIVE FOR SMALL MACHINERY, ALTERNATIVELY TO BE USED FOR ELECTRIC AND MECHANICAL ENERGY

Max Meier-Maletz, Dusseldorf-Oberkassel, and Gerhard Meier-Maletz, Buderich, near Dusseldorf, Germany Application March 20, 1956, Serial No. 572,779

5 Claims. (Cl. 310—273)

This invention relates to a drive for small machinery, alternatively to be used for electric and mechanical energy.

There is a number of devices, in particular household and kitchen appliances, e. g. apparatuses used for mixing of food and luxury food, so-called mixers, shavers, etc. which are conventionally driven by electric power as electric energy is always available in the form of mains circuit. More recently however, difficulties have been experienced in the general use of such devices when intended to be used during trips, hunting, sporting and in particular when camping. In such cases no electrical energy is available or can be made available conveniently, so that such devices become useless unless they are provided with a mechanical drive. Gyrating mass or fly wheel type drive has been particularly adopted as a mechanical drive for such purposes, as this type of drive makes it possible to do with a relatively strong but short time expenditure of energy, so that during the utilization of the energy accumulated in the rotating mass the hands of the operator are again free to perform the proper work, e. g. shaving. A difficulty was that these rotating mass drives are unsuitable to be driven by electric energy, which in turn made it necessary to have two devices or at least to provide two different drive mechanisms in order to provide the possibility on the one-hand to use electric current and on the other hand to use hand driven means to supply the necessary energy.

The invention has therefore for its object to dispense with this necessity to have two devices or two different drive mechanisms.

Small machinery drives to be used alternatively for electric and mechanical energy as proposed according to the invention are characterized in that the gyrating or rotating mass of a gyrating mass motor is designed as the rotor of an electric motor, the stator system of which forms an independent structural component and, when supplied with electric energy can be joined with the gyrating mass motor and when the latter is operated with mechanical energy the stator system can be separated from it. Thereby it is no more necessary to rotate or move the relatively heavy electrical part of the device when being operated with mechanical energy. In addition, due to the phenomina of residual magnetism the disposition of a stator system would have the effect that during the operation of small machinery with mechanical energy the latter would become unnecessarily great, because a portion of same is converted uselessly into electric energy. In addition, unnecessary strain could be produced due to short-circuit and eddy currents which will cause a decreased service life of the electric parts. If, however, gyrating masses or rotor and stator system are disposed in separate housings it is relatively simple to effect a junction or a separation of these two drive mechanisms. There is the possibility, e. g., to provide an annular housing for the stator system which can be plugged on to a central housing provided for the gyrating mass so as to realize in this manner a junction of the two housings and thus to provide for electric drive, while on the other hand the two housings can be easily separated by removing the housing containing the stator system from the central housing.

It is already known in the art of electrical engineering to design the stator systems of electric motors so as to be capable of being easily interchanged to comply with the requirements for repair or replacement, however, non-obvious thought was necessary to arrive at the perception that mechanical drives of the type under consideration need to be accomplished as proposed according to the present invention.

An embodiment of the invention is illustrated schematically in the accompanying drawing by way of example of a shaver to be operated with gyrating mass and electric drive.

Figure 2:
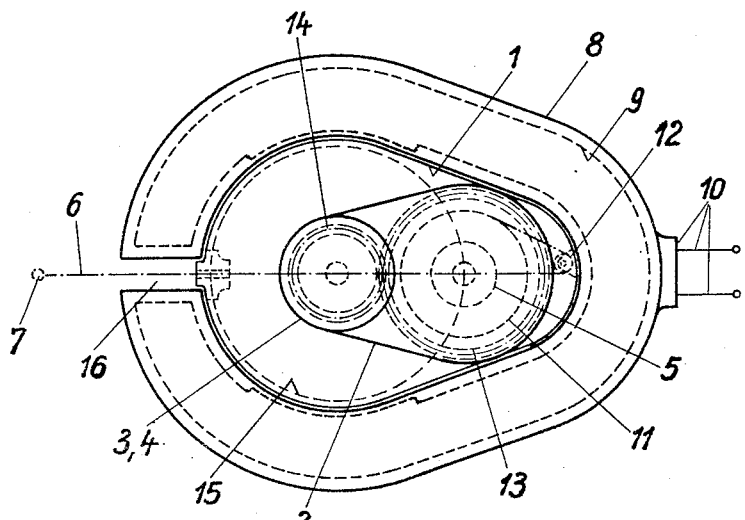

Fig. 1 shows in vertical longitudinal sections the gyrating mass drive disposed in a central housing with annular housing for the stator system in place, while Fig. 2 is a plan view of the two parts in assembled condition.

In the figures, the numeral 1 designates the housing of a flywheel motor, which is constructed in a manner known per se, as source of impulsion for a dry shaver whose transmission gear is housed in a part 2 and whose shearing head 3 with a protection cap mounted thereon can be seen at 4. Provided in the housing 1 are, in the customary and known manner, a strap pulley 11 with a drive cord being guided over the guide pulley 12 and with a "pearl" or ring 7 at the end of the cord. The strap pulley 11 is connected with the other parts of the gear in the known manner via a free wheeling clutch 5. Among these gear parts which are driven by the strap pulley 11 via the free wheeling clutch is the toothed wheel 13 which is arranged in the housing 2, and toothed wheel combing with a toothed wheel 14 which, in turn, is rigidly mounted on the drive shaft of the shear head. The flywheel mass 15 is rigidly connected to the toothed wheel 14. When the cord 6 is pulled out of the housing 2 vigorously, the strap pulley 11 is caused to rotate. This drive movement extends to the toothed wheels 13 and 14 via the free wheeling clutch 5 and thus finally to the flywheel mass 15. The latter is caused to rotate rapidly so that the shearing-knife-arrangement in the shearing head 5 is given a uniform movement, whereby the rotating heavy flywheel mass 15 has so much energy by the time the shearing resistance occurs that only an inconsequential delay in the rotation of the shearing-knife-arrangement takes place. As soon as the cord 6 is completely wound off the strap pulley 11, a spring (not shown) draws the strap pulley back into the starting position and, at the same time, the free wheeling clutch 5 uncouples the strap pulley from the toothed wheel 13, whereby the free wheeling of the clutch provides a continued rotation of the gear parts 13, 14 and 15. As soon as the cord 6 is wound back on the strap pulley 11, a new pulling-off operation of this cord 6 can be performed so that the toothed wheel 13 and thus the gear parts 14 and 15 receive a new rotation impetus which again provides a uniform rotation of the shearing-knife-arrangement.

All the foregoing steps are known features and known steps and, therefore, do not constitute the subject matter or core of the present invention.

According to this invention, apart from and in addition to the central housings 1, 2, and 4 and in addition to the gear parts which are housed in these housings as well as in addition to the shearing-knife-arrangement, a further annular housing 8 is provided which is so disposed that it can be slipped on the housing 1 and pulled off the same. In order not to disturb the slipping on or pulling off operation, the housing 1 is provided with a slot at 16 so that it assumes the shape of a horse-shoe. Also a stator system 9 for the flywheel mass 15, provided as rotor of the electric motor, has horse-shoe-shape. The effect of a horseshoe magnet in the housing 8 can be increased in that this horseshoe magnet is provided as an electro magnet whereby also a plug connection is additionally provided for feeding current to the electric motor from the system. When the flywheel mass 15 is provided as a magnet or reaction motor (one-phase synchronous motor having a toothed rotor without winding and a toothed magnet) or with a short circuited winding (asynchronous motor with a squirrel-cage winding or condenser motor), the effects of the stator system 9 are sufficient for the achievement of rotation of the toothed or short circuited rotor 15 when alternating or multiphase current, respectively, are fed via the plug arrangement 10, whereby a rapid start can be obtained in that mechanical energy is provided manually by way of the strap 6, 7 which then leads to an acceleration of the rotor 15 to the full speed.

It is in the nature of the invention that the design of the gyrating mass motor is by no means limited by a cord drive. In place of the cord drive, any other means of drive can be used as, e. g. friction wheel drive, toothed segment drive or crank drive as already known and in use with toys, pocket lamps, centrifuges etc.

It will be understood that this invention is susceptible to modification in order to adapt it to different usages and conditions; and, accordingly, it is desired to comprehend such modifications within this invention as may fall within the scope of the appended claims.

We claim:

1. A drive for small machinery to be operated alternatively by means of mechanical, electric or electromagnetic energy supplied to the drive mechanism, said drive comprising a gyrating mass motor, said gyrating mass motor designed as the rotor of an electric motor, said drive further comprising a further independent structural part which is designed as a stator of said electric motor, contacts at said stator for supply of electric energy, means to combine the stator temporarily with the rotor, said combination adapted by means of the gyrating mass motor acting as a rotor of the electric motor to drive electrically or electro-magnetically parts that can be connected with and are driven by the gyrating mass motor, means to separate said stator from the rotor, said rotor mechanically driven and separated from the stator, adapted to drive mechanically parts that can be connected with it.

2. A drive for small machinery to be operated alternatively by means of mechanical, electric or electromagnetic energy supplied to the drive mechanism, said drive comprising a gyrating mass motor, said gyrating mass motor designed as the rotor of an electric motor, a housing encasing said rotor, said drive further comprising a further independent structural part which is designed as a stator of said electric motor, contacts at said stator for supply of electric energy, a housing encasing said stator, means adapted to combine the rotor housing with the stator housing, said combination adapted by means of the gyrating mass motor acting as a rotor of the electric motor to drive electrically or elecerto-magnetically parts that can be connected with and are driven by the gyrating mass motor, means, adapted to separate the stator housing from the rotor housing, said rotor mechanically driven and separated from the stator, adapted to drive mechanically parts that can be connected with it.

3. A drive for small machinery to be operated alternatively by means of mechanical, electric or electromagnetic energy supplied to the drive mechanism, said drive comprising a gyrating mass motor, said gyrating mass motor designed as the rotor of an electric motor, a housing encasing said rotor, said housing designed as a central housing for the electric motor, said drive further comprising a further independent structural part which is designed as a stator of said electric motor, contacts at said stator for supply of electric energy, a housing encasing said stator, said housing encasing the stator designed as an external housing which can be slid on to and again removed from the central housing.

4. A drive according to claim 3, said external housing horseshoe shaped in a plane which is perpendicular to the axis of the rotor, the space between the legs of the horseshoe adapted to permit passing through of the drive means for the gyrating mass motor.

5. A drive according to claim 3, said external housing designed of annular shape in a plane which is perpendicular to the axis of the rotor, said housing comprising a recess, said recess so designed as to be adapted for passing through the mechanical drive means of the gyrating mass motor.

No references cited.